United States Patent
DeVal et al.

(10) Patent No.: US 7,808,894 B2
(45) Date of Patent: Oct. 5, 2010

(54) MANAGING BURSTS OF TRAFFIC IN SUCH A MANNER AS TO IMPROVE THE EFFECTIVE UTILIZATION OF SESSION SERVERS

(75) Inventors: Gary John DeVal, Raleigh, NC (US); Curtis E. Hrischuk, Holly Springs, NC (US); Mark Johnson, Cincinnati, OH (US); Craig Andrew Lanzen, Lambertville, MI (US); James Winston Lawwill, Jr., Winchester, KY (US); Timothy Paul Pickett, Rochester, MN (US); Brian Pulito, Lexington, KY (US)

(73) Assignee: International Business Machines Corporation, Armonk, NY (US)

( * ) Notice: Subject to any disclaimer, the term of this patent is extended or adjusted under 35 U.S.C. 154(b) by 158 days.

(21) Appl. No.: 11/937,748

(22) Filed: Nov. 9, 2007

(65) Prior Publication Data

US 2009/0122705 A1 May 14, 2009

(51) Int. Cl.
*G01R 31/08* (2006.01)
(52) U.S. Cl. .................................... 370/229; 370/230.1
(58) Field of Classification Search ........ 370/229–236.2, 370/241.1–246, 369, 375, 376, 372, 394.5, 370/458, 459, 498, 395.2, 253
See application file for complete search history.

(56) References Cited

U.S. PATENT DOCUMENTS

| | | | | |
|---|---|---|---|---|
| 6,038,218 | A * | 3/2000 | Otsuka et al. | 370/236 |
| 6,259,776 | B1 * | 7/2001 | Hunt | 379/114.01 |
| 6,707,792 | B1 * | 3/2004 | Volftsun et al. | 370/235 |
| 6,813,264 | B2 | 11/2004 | Vassilovski | 370/352 |
| 6,870,848 | B1 | 3/2005 | Prokop | 370/395.2 |
| 7,187,651 | B1 * | 3/2007 | Volftsun et al. | 370/235 |
| 7,269,655 | B2 | 9/2007 | Kim | 709/228 |
| 7,441,429 | B1 | 10/2008 | Nucci et al. | |
| 2006/0067231 | A1 * | 3/2006 | Ikoma et al. | 370/235 |

(Continued)

OTHER PUBLICATIONS

Office Action for U.S. Appl. No. 11/937,701 dated Jan. 5, 2010.

(Continued)

*Primary Examiner*—Kwang B Yao
*Assistant Examiner*—Jung Liu
(74) *Attorney, Agent, or Firm*—Robert A. Voigt, Jr.; Winstead, P.C.

(57) ABSTRACT

A method, system and computer program product for managing bursts of traffic. A counter, referred to herein as a "frequency counter," is incremented during those time intervals an overload condition is detected and is decremented during those time intervals an overload condition is not detected. An overload condition may refer to when the number of out-of-dialog messages exceeds a threshold value corresponding to the maximum number of out-of-dialog messages that should be accepted and forwarded to an associated session server. If the count of the frequency counter exceeds some pre-configured value, then traffic that exceeds the threshold for the overload condition is stopped from being sent to the associated session server. Otherwise, traffic that exceeds the threshold for the overload condition is permitted to be sent to the associated session server. By managing bursts of traffic in such a manner, the effective utilization of session servers is improved.

20 Claims, 4 Drawing Sheets

U.S. PATENT DOCUMENTS

| | | | |
|---|---|---|---|
| 2006/0245359 A1* | 11/2006 | Hosein | 370/235 |
| 2007/0070989 A1* | 3/2007 | Savoor et al. | 370/356 |
| 2008/0002576 A1* | 1/2008 | Bugenhagen et al. | 370/229 |
| 2008/0049615 A1* | 2/2008 | Bugenhagen | 370/230.1 |
| 2008/0117816 A1* | 5/2008 | Stone et al. | 370/230.1 |
| 2008/0192628 A1* | 8/2008 | Williams | 370/230 |
| 2008/0198748 A1* | 8/2008 | Gilfix et al. | 370/235 |
| 2009/0092111 A1* | 4/2009 | Horn et al. | 370/338 |

OTHER PUBLICATIONS

Malas, SIP Performance Metrics, Network Working Group Internet Draft, Jun. 1, 2006.

* cited by examiner

MANAGING BURSTS OF TRAFFIC IN SUCH A MANNER AS TO IMPROVE THE EFFECTIVE UTILIZATION OF SESSION SERVERS

CROSS REFERENCE TO RELATED APPLICATIONS

The present invention is related to the following U.S. Patent Application which is incorporated herein by reference: Ser. No. 11/937,701 entitled "Limiting Extreme Loads at Session Servers" filed Nov. 9, 2007.

TECHNICAL FIELD

The present invention relates to telecommunication networks, and more particularly to managing bursts of traffic in such a manner as to improve the effective utilization of session servers.

BACKGROUND INFORMATION

Telecommunication systems can be time based or packet based. For example, a wireless telephone or cell phone can communicate using a time based technique such as Code Division Multiple Access (CDMA). By contrast, the Internet is a packet based system which can support Internet Protocol (IP) telephony for allowing the real time delivery of voice and other multimedia services. Internet telephony, also known as Voice over Internet Protocol (VoIP), allows for the conversion and transmission of voice data from a time based system into a packet based system. VoIP services are convenient in that they allow users to communicate through the Internet using a personal computer. VoIP services have also merged with the time based system such as the standard PSTN to provide long distance telephony at reduced costs.

Internet technology is session based rather than connection based. The underlying foundation is an IP layer that makes a best effort to deliver packets, even though it provides unreliable connectionless service at the network layer. Session Initiation Protocol (SIP) is an application-layer control (signaling) protocol for creating, modifying, and terminating sessions with one or more participants. SIP is generally used to establish an Internet session and negotiate the capabilities of the session. The sessions can include Internet telephone calls, multimedia distribution, and multimedia conferences. In general, SIP invitations are used to create sessions, and the invitations carry session descriptions that allow participants to agree on a set of compatible media types.

SIP provides signaling services for establishing and negotiating a secure and unsecured session but does not actually provide service offerings. SIP has many uses, including VoIP. Within the context of VoIP, SIP handles the call set up between devices and opens the lines, or streams, of communication. For example, a telecommunications system implementing SIP, may include a SIP client which initiates a SIP call set up with a "SIP server" directly with the server or through the "SIP router," thereafter followed by a handshaking procedure to open a communication dialogue. The SIP procedure can handle the connection and negotiate the session content. Once a SIP session is established, the SIP client can communicate with the SIP server. For example, the SIP client can run a VoiceXML program to send and receive voice data in an XML format from the SIP server. The SIP server can process the data and work with the SIP client to provide the requested voice service. SIP also makes use of the SIP routers to help route requests to a user's current location, authenticate and authorize users for services, implement provider call-routing policies, and provide features to users. SIP also provides a registration function that allows users to upload their current locations for use by the SIP routers.

In the VoIP context, there may be times when the SIP server's capacity is overloaded by processing and responding to an excessive number of requests in a short period of time. For example, suppose thousands of viewers of the television show American Idol called at roughly the same time to place their vote as to who should advance on the television show and these calls were attempted to be set-up with a particular SIP server. The processing capability of that particular SIP server may not be able to handle all these requests to set-up phone calls thereby causing the SIP server to be overloaded.

There have been attempts in handling overload situations described above. Typically, an upper and a lower threshold of the number of messages to be processed are used to determine if an overload condition occurs and when the overloaded condition no longer exists. For example, when the number of messages that are sent to the SIP server to be processed by the SIP server exceeds the upper threshold of the number of messages to be processed, then the SIP server is designated as being in an overload condition and will therefore limit the number of messages processed until the number of messages to be processed by the SIP is lower than the lower threshold.

However, implementing an upper and a lower threshold to handle overload situations may cause extreme fluctuations of messages to be processed by the SIP servers which can result in instabilities of the system. For example, since SIP uses unreliable messaging, an acknowledgment is required for each message received. If the sender of the message does not receive an acknowledgement, it resends the message. Hence, when the SIP server receives a number of messages that exceeds the upper threshold, it is deemed to be overloaded, and hence the number of messages to be processed is minimized thereby causing the SIP server to not send acknowledgements to some of the received messages. As a result, the overloaded SIP server will continue to receive these requests. The SIP server may not be able to process these requests unless the number of messages is below the lower threshold. The SIP router may then have these requests processed by other SIP servers since the SIP server is overloaded. However, these additional requests may cause the other SIP servers to become overloaded. Hence, the entire system could possibly become overloaded.

There are times though that an overload condition is detected but will quickly revert back to a non-overload condition after the overload condition is detected. For example, "garbage collection" (technique in Java™) may periodically occur to reclaim memory used by objects that will not be accessed again by an application. While the garbage collection technique lasts for a short duration of time (e.g., less than one second), it may cause inactivity for a longer duration of time (e.g., greater than one second) which may result in a burst of traffic when SIP router and SIP servers are able to receive and process messages. If these bursts of activity, which only last a short duration of time, were interpreted as being an overload condition, then an SIP server may be forced to reduce the number of messages to be processed. Further, messages that cannot be processed by that SIP server may be sent to other SIP servers to be processed which may cause these SIP servers to be overloaded as discussed above. Hence, when these bursts of activity occur, it may be advantageous to not enter into an overload state thereby not causing the entire system to become overloaded as discussed above. Further, by not entering into an overload state when these bursts of activity occur, the utilization of SIP servers will be improved.

Therefore, there is a need in the art for managing bursts of traffic in such a manner as to improve the effective utilization of Session Initiation Protocol (SIP) servers.

SUMMARY

The problems outlined above may at least in part be solved in some embodiments by determining the frequency of these bursts of traffic. A burst of traffic may exceed a threshold value corresponding to the maximum number of out-of-dialog messages that should be accepted and forwarded to an associated Session Initiation Protocol (SIP) server. Such a condition may be referred to herein as an "overload condition." Rather than just not admitting any traffic that exceeds this threshold in an overload condition, a short burst of traffic that exceeds this threshold in an overload condition may be admitted and forwarded to the associated SIP server as long as the traffic burst is not sustained for an extended period of time. The duration of these bursts of traffic is monitored by using a counter, referred to herein as the "frequency counter," which tracks the number of time intervals an overload condition is detected. The frequency counter is incremented during those time intervals an overload condition is detected and is decremented during those time intervals an overload condition is not detected. If the count of the frequency counter exceeds some pre-configured value ("frequency count threshold"), then traffic that exceeds the threshold for the overload condition is stopped from being sent to the associated SIP server. Otherwise, traffic that exceeds the threshold for the overload condition is permitted to be sent to the associated SIP server. By managing bursts of traffic in such a manner, the effective utilization of SIP servers is improved.

In one embodiment of the present invention, a method for managing bursts of traffic comprises the step of incrementing a counter for each time interval in an overload condition. The method further comprises decrementing the counter for each time interval not in the overload condition. The method further comprises disabling a sending of a number of out-of-dialog messages that exceed a threshold indicating the overload condition to an associated session server in a next time interval if a count of the counter exceeds a second threshold, where the second threshold corresponds to a maximum number of time intervals to be in the overload condition.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

Figure 1:
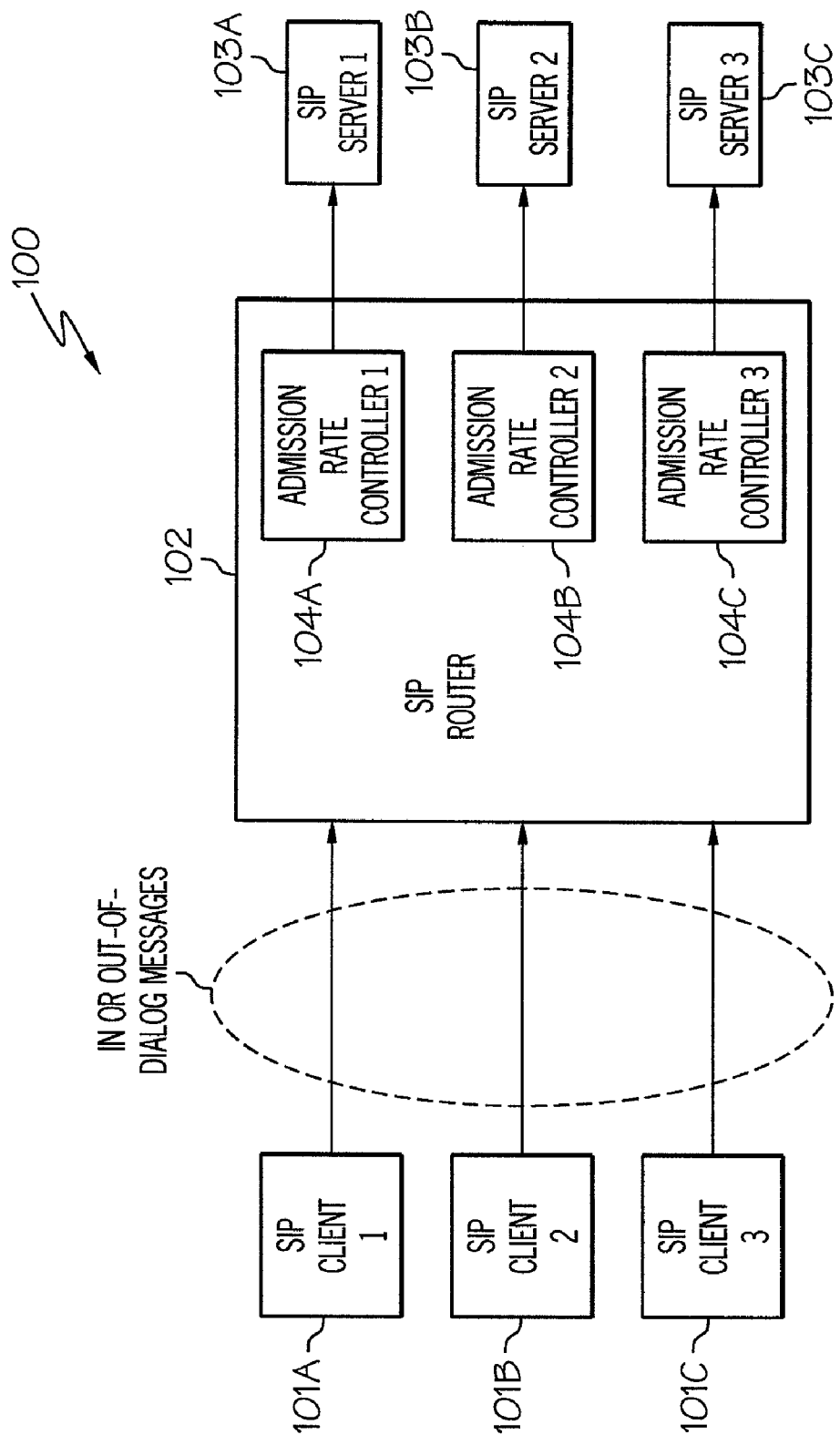
FIG. 1 illustrates a Session Initiation Protocol (SIP) service system in accordance with an embodiment of the present invention.

The present invention comprises a method, system and computer program product for managing bursts of traffic. In one embodiment of the present invention, bursts of traffic are managed by determining the frequency of these bursts of traffic. A burst of traffic may exceed a threshold value corresponding to the maximum number of out-of-dialog messages that should be accepted and forwarded to an associated Session Initiation Protocol (SIP) server. Such a condition may be referred to herein as an "overload condition." Rather than just not admitting any traffic that exceeds this threshold in an overload condition, a short burst of traffic that exceeds this threshold in an overload condition may be admitted and forwarded to the associated SIP server as long as the traffic burst is not sustained for an extended period of time. The duration of these bursts of traffic is monitored by using a counter, referred to herein as the "frequency counter," which tracks the number of time intervals an overload condition is detected. The frequency counter is incremented during those time intervals an overload condition is detected and is decremented during those time intervals an overload condition is not detected. If the count of the frequency counter exceeds some pre-configured value ("frequency count threshold"), then traffic that exceeds the threshold for the overload condition is stopped from being sent to the associated SIP server. Otherwise, traffic that exceeds the threshold for the overload condition is permitted to be sent to the associated SIP server. By managing bursts of traffic in such a manner, the effective utilization of SIP servers is improved.

While the following discusses the present invention in connection with implementing the Session Initiation Protocol (SIP), the principles of the present invention may be applied to other protocols that exhibit the same type of behavior as SIP, such as HyperText Transfer Protocol (HTTP) or a combination of SIP and HTTP. For example, a shopping cart application (e.g., Amazon.com) may use HTTP in a manner with similar characteristics as SIP. For instance, when a customer selects an item on a website to be purchased, a session is created and information about the customer is stored. Further, the communication exchanges (e.g., requests, responses) between the customer and the shopping cart application are "dialogs." Additionally, the shopping cart application may be overloaded with requests thereby causing the shopping cart application to reject new order requests but still continue to process existing requests. In another example, there can be a combination of SIP and HTTP protocols. For instance, a user may input information about a defective product on the manufacturer's website and then contact a repair specialist with VoIP using a link provided on the manufacturer's website. The repair specialist may receive the information inputted by the customer (session information from HTTP webpage) thereby more effectively assisting the customer.

A person of ordinary skill in the art would be capable of applying the principles of the present invention to such other protocols, such as HTTP and the combination of SIP and HTTP. Further, embodiments applying the principles of the present invention to such other protocols, such as HTTP and the combination of SIP and HTTP, would fall within the scope of the present invention.

Further, it is noted for clarity that the use of the term "session server" herein is to include servers implementing SIP as well as other protocols exhibiting the same type of behavior as SIP, such as HTTP and a combination of SIP and HTTP.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

FIG. 1—SIP Service System

FIG. 1 illustrates an embodiment of the present invention of a Session Initiation Protocol (SIP) service system 100. SIP system 100 may include one or more SIP clients 101A-C. SIP clients 101A-C may collectively or individually be referred to as SIP clients 101 or SIP client 101, respectively. Each SIP client 101 may be connected to a SIP router 102 which may be connected to one or more SIP servers 103A-C. SIP servers 103A-C may collectively or individually be referred to as SIP servers 103 or SIP server 103, respectively. SIP client 101 can communicate directly with SIP server 103, or through SIP router 102. SIP server 103 can also be connected to other SIP compliant servers or SIP compliant devices not shown in FIG. 1. A description of the hardware configuration of SIP router 102 and SIP server 103 is provided further below in connection with FIG. 2. It is noted that system 100 may include any number of SIP clients 101, SIP routers 102 and SIP servers 103 and that FIG. 1 is illustrative.

Referring to FIG. 1, SIP client 101 can initiate a SIP call set-up with SIP server 103 directly with SIP server 103 or through SIP router 102, thereafter followed by a handshaking procedure to open a communication dialogue. The SIP procedure can handle the connection and negotiate the session content. Once a SIP session is established, SIP client 101 can communicate with SIP server 103. For example, SIP client 101 can run a VoiceXML program to send and receive voice data in an XML format from SIP server 103. SIP server 103 can process the data and work with SIP client 101 to provide the requested voice service. SIP also makes use of router 102 to help route requests to a user's current location, authenticate and authorize users for services, implement provider call-routing policies, and provide features to users. SIP also provides a registration function that allows users of SIP clients 101 to upload their current locations for use by router 102.

Within SIP protocol, there are three types of messages that can be sent from SIP client 101. One type of message refers to those that attempt to start a communication session, or a "dialog," with SIP server 103. Another type of message refers to those messages that are self-contained requests and that do not start a communication session. For example, an information or register message may not require the start of a communication session. These first two types of messages may be referred to herein as "out-of-dialog" messages. The third type of message may refer to messages that are currently being sent and receive for an active communication session between SIP client 101 and SIP server 103. For example, voice data may be sent to SIP client 101 from SIP server 103 during a communication session with SIP server 103. These types of messages may be referred to herein as "in-dialog" messages.

As illustrated in FIG. 1, in-dialog messages as well as out-of-dialog messages may be sent from SIP client 101 to SIP router 102. SIP router 102 may then in turn transfer those messages to the appropriate SIP server 103.

SIP router 102 may be configured to control the flow of messages being sent to SIP servers 103. In one embodiment, SIP router 102 may include one or more "admission rate controllers" 104A-C used to control the flow of messages to its associated SIP servers 103. Admission rate controllers 104A-C may collectively or individually be referred to as admission rate controllers 104 or admission rate controller 104, respectively. In one embodiment, SIP router 102 may include an admission rate controller 104 designated for controlling the flow of messages to a designated SIP server 103. For example, admission rate controller 104A may be designated to control the flow of messages to SIP server 103A.

As discussed in the Background Information section, there are times that an overload condition is detected but will quickly revert back to a non-overload condition after the overload condition is detected. For example, "garbage collection" (technique in Java™) may periodically occur to reclaim memory used by objects that will not be accessed again by an application. While the garbage collection technique lasts for a short duration of time (e.g., less than one second), it may cause inactivity for a longer duration of time (e.g., greater than one second) which may result in a burst of traffic when SIP routers and SIP servers are able to receive and process messages. If these bursts of activity, which only last a short duration of time, were interpreted as being an overload condition, then an SIP server may be forced to reduce the number of messages to be processed. Further, messages that cannot be processed by that SIP server may be sent to other SIP servers to be processed which may cause these SIP servers to be overloaded as discussed above. Hence, when these bursts of activity occur, it may be advantageous to not enter into an overload state thereby not causing the entire system to become overloaded as discussed above. Further, by not entering into an overload state when these bursts of activity occur, the utilization of SIP servers will be improved. Therefore, there is a need in the art for managing bursts of traffic in such a manner as to improve the effective utilization of Session Initiation Protocol (SIP) servers.

Figure 3:
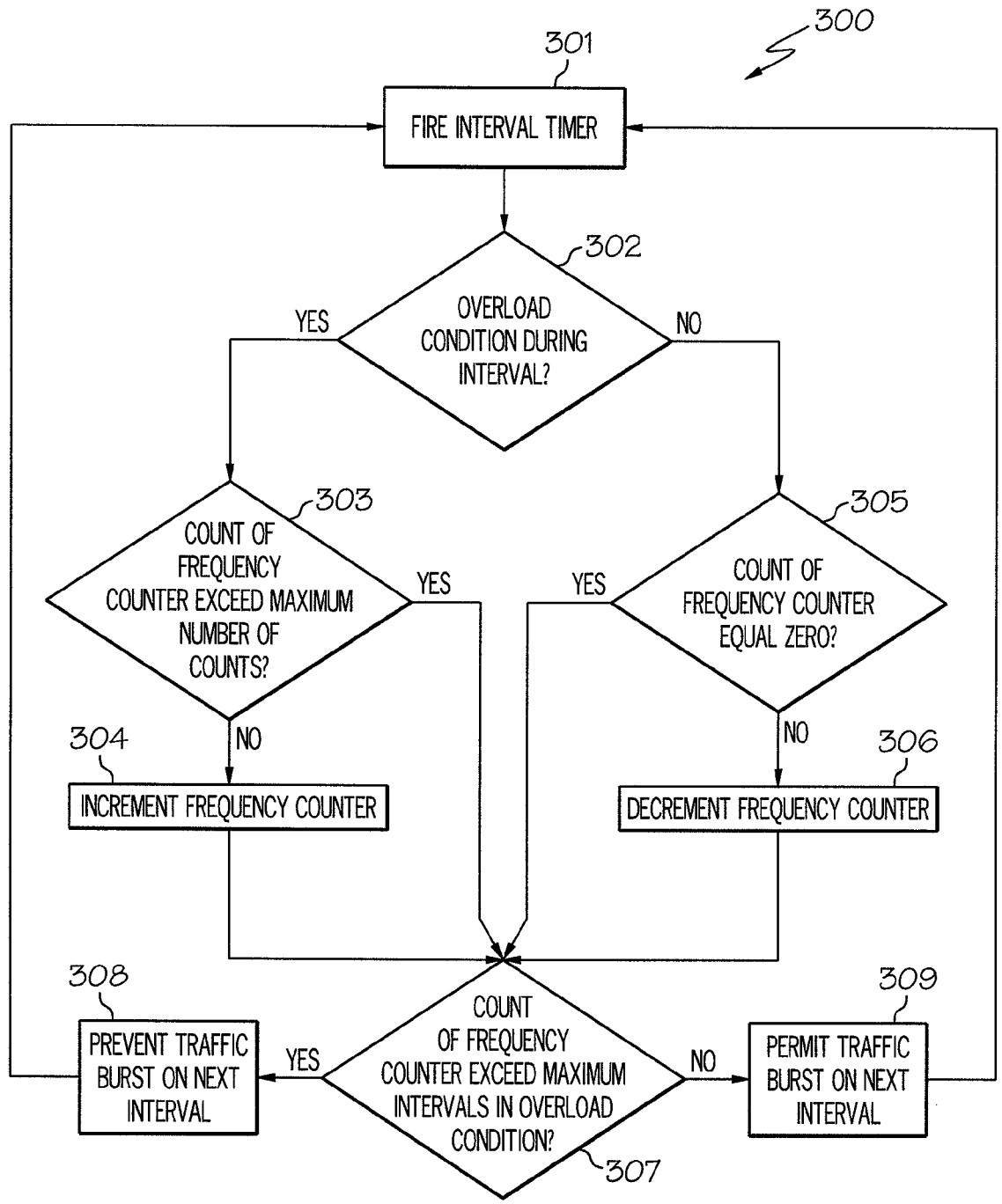
FIG. 3 is a flowchart of a method for managing the bursts of traffic in such a manner as to improve the effective utilization of SIP servers in accordance with an embodiment of the present invention.
Figure 4:
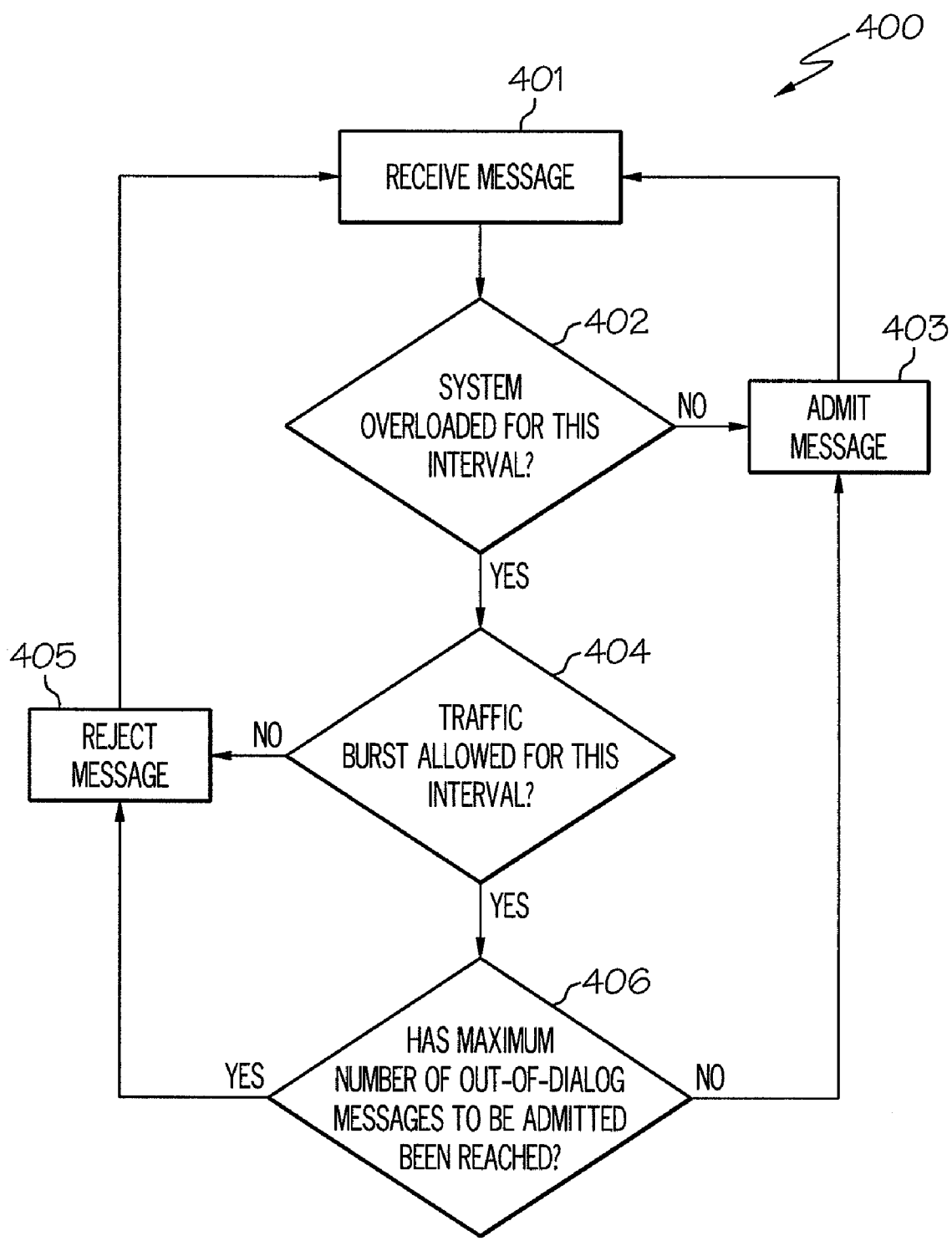
FIG. 4 is a flowchart of a method for handling messages received during the process for managing bursts of traffic in accordance with an embodiment of the present invention.

These bursts of traffic may be managed in such a manner by admission rate controllers 104 as to improve the effective utilization of its associated SIP servers 103 as discussed further below in connection with FIGS. 3 and 4. FIG. 3 is a flowchart of a method for managing bursts of traffic in such a manner as to improve the effective utilization of SIP servers 103. FIG. 4 is a flowchart of a method for handling messages received during the process for managing bursts of traffic. As discussed above, a description of the hardware configuration of SIP router 102 and SIP server 103 is provided in connection with FIG. 2.

Figure 2:
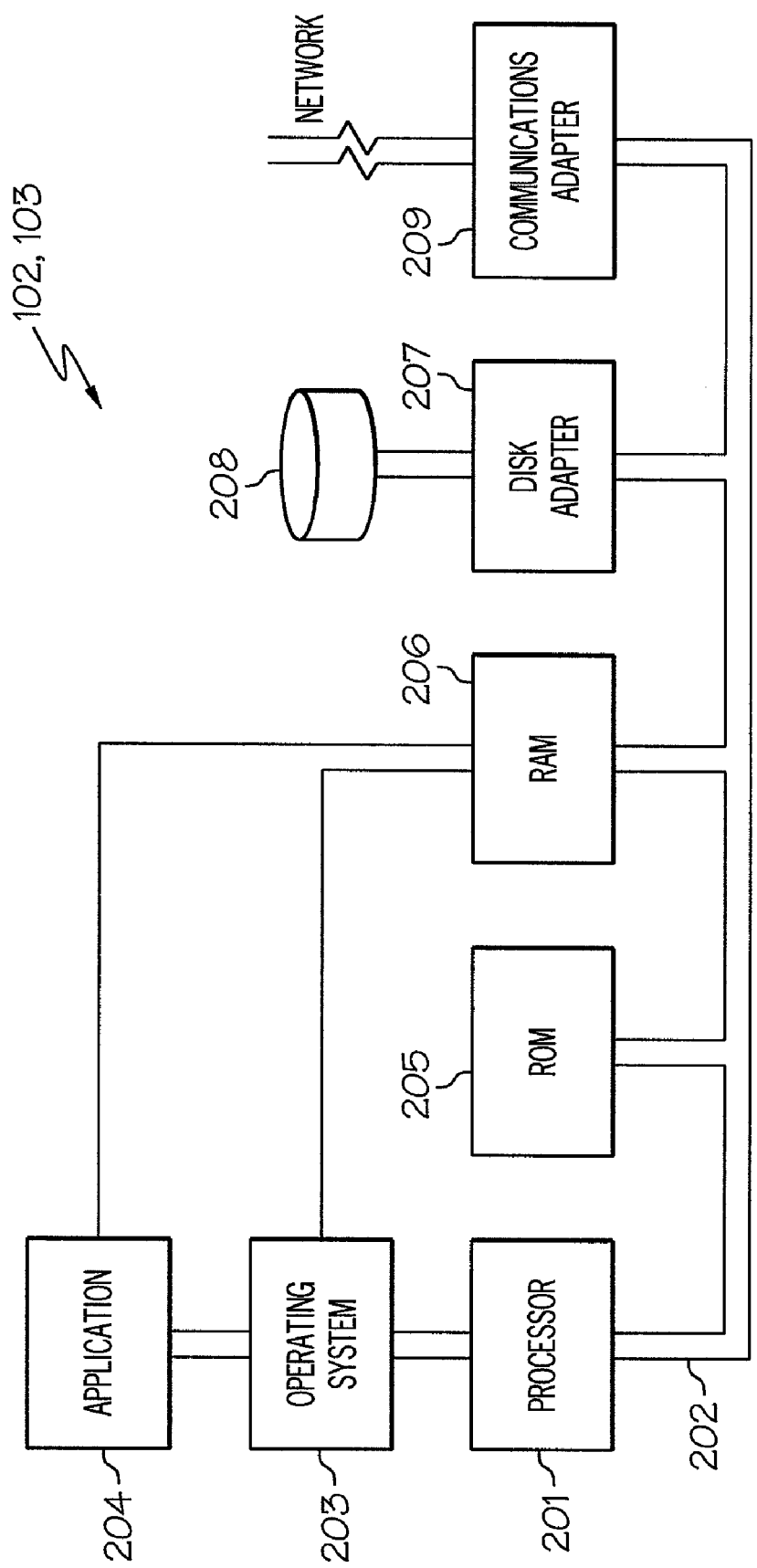
FIG. 2 illustrates a hardware configuration of a SIP router and a SIP server in accordance with an embodiment of the present invention.

FIG. 2—SIP Router/SIP Server

FIG. 2 illustrates an embodiment of a hardware configuration of a SIP router 102 (FIG. 1) and SIP server 103 (FIG. 1) which is representative of a hardware environment for practicing the present invention. SIP router 102, SIP server 103 may have a processor 201 coupled to various other components by system bus 202. An operating system 203 may run on processor 201 and provide control and coordinate the functions of the various components of FIG. 2. An application 204 in accordance with the principles of the present invention may run in conjunction with operating system 203 and provide calls to operating system 203 where the calls implement the various functions or services to be performed by application 204. Application 204 for SIP router 102 may include, for example, a software implementation of admission rate controller 104 (FIG. 1) configured to manage the bursts of traffic in such a manner as to improve the effective utilization of SIP servers 103 as well as handle messages received during the process for managing bursts of traffic, as discussed further below in association with FIGS. 3 and 4. Further, the software implementation of admission rate controller 104 may include a timer ("interval timer") configured to expire at the end of a time interval, as discussed further below in association with FIG. 3. Further, the implementation of admission rate controller 104 may include a counter ("frequency counter") configured to count the number of time intervals that the traffic received by admission rate controller 104 exceeds the threshold for an overload condition, as discuss further below in association with FIG. 3.

Referring to FIG. 2, Read-Only Memory (ROM) 205 may be coupled to system bus 202 and include a basic input/output system ("BIOS") that controls certain basic functions of SIP router 102, SIP server 103. Random access memory (RAM) 206 and disk adapter 207 may also be coupled to system bus 202. It should be noted that software components including operating system 203 and application 204 may be loaded into RAM 206, which may be SIP router's 102, SIP server's 103 main memory for execution. Disk adapter 207 may be an integrated drive electronics ("IDE") adapter that communicates with a disk unit 208, e.g., disk drive. It is noted that the software implementation of admission rate controller 104, as discussed further below in association with FIGS. 3 and 4, may reside in disk unit 208 or in application 204.

Referring to FIG. 2, computer system 107 may further include a communications adapter 209 coupled to bus 202. Communications adapter 209 may interconnect bus 202 with an outside network (not shown) thereby allowing SIP router 102, SIP server 103 to communicate amongst each other as well as with SIP client 101 (FIG. 1).

The various aspects, features, embodiments or implementations of the invention described herein can be used alone or in various combinations. The methods of the present invention can be implemented by software, hardware or a combination of hardware and software. The present invention can also be embodied as computer readable code on a computer readable medium. The computer readable medium is any data storage device that can store data which can thereafter be read by a computer system. Examples of the computer readable medium include read-only memory, random access memory, CD-ROMs, flash memory cards, DVDs, magnetic tape, and optical data storage devices. The computer readable medium can also be distributed over network-coupled computer systems so that the computer readable code is stored and executed in a distributed fashion.

FIG. 3—Method for Managing Bursts of Traffic

FIG. 3 is a flowchart of a method 300 for managing the bursts of traffic in such a manner as to improve the effective utilization of SIP servers 103 (FIG. 1) in accordance with an embodiment of the present invention.

Referring to FIG. 3, in conjunction with FIGS. 1-2, in step 301, admission rate controller 104 fires a timer, referred to herein as the "interval timer," for a particular interval of time (e.g., 1 second). It is noted that "interval of time" may also be referred to herein as simply "interval." In one embodiment, the interval timer may be configured in software or hardware and may reside within admission rate controller 104 or within SIP router 102.

In step 302, admission rate controller 104 determines if there is an overload condition during the interval. In one embodiment, an overload condition occurs when the number of out-of-dialog messages received by admission rate controller 104 to be sent to its associated SIP server 103 exceeds a threshold.

If there is an overload condition during the interval, then, in step 303, admission rate controller 104 determines if the count of a counter, referred to herein as the "frequency counter," exceeds the maximum number of counts. In one embodiment, the frequency counter is configured to count the number of time intervals that the traffic received by admission rate controller 104 exceeds the threshold for an overload condition. The frequency counter may be configured in software or hardware and may reside within admission rate controller 104 or within SIP router 102.

If the frequency counter does not exceed the maximum number of counts, then, in step 304, admission rate controller 104 increments the frequency counter. In this manner, the frequency counter is incremented for each interval that there is an overload condition up to a threshold value.

Returning to step 302, if, however, there is not an overload condition during the interval, then, in step 305, admission rate controller 104 determines if the count of the frequency counter is zero. If the count of the frequency counter is not zero, then, in step 306, admission rate controller 104 decrements the frequency counter. In this manner, the frequency counter is decremented for each interval that there is not an overload condition until the count of the frequency counter is zero.

Returning to steps 303, 304, 305, 306, if the count of the frequency counter exceeds the maximum number of counts or if the count of the frequency counter equals zero or upon incrementing or decrementing the frequency counter, then, in step 307, admission rate controller 104 determines whether the count of the frequency counter exceeds the threshold for the maximum number of intervals to be in the overload condition. If the count of the frequency counter exceeds the threshold for the maximum number of intervals to be in the overload condition, then, in step 308, admission rate controller 104 disables the sending of the out-of-dialog messages that exceed the threshold indicating the overload condition to its associated SIP server 103. That is, in step 308, admission rate controller 104 stops admitting traffic to its associated SIP server 103 that exceeds the threshold for the overload condition. In one embodiment, the threshold for the maximum number of counts exceeds the threshold for the maximum number of intervals to be in the overload condition.

Upon stopping admitting traffic to its associated SIP server 103 that exceeds the threshold for the overload condition, admission rate controller 104, in step 301, fires the interval timer for the next interval of time.

If, however, the count of the frequency counter does not exceed the threshold for the maximum number of intervals to be in the overload condition, then, admission rate controller 104, in step 309, permits the traffic burst on the next interval. That is, if the count of the frequency counter does not exceed the threshold for the maximum number of intervals to be in the overload condition, then admission rate controller 104 permits the sending of the number of out-of-dialog messages that exceed the threshold indicating the overload condition to its associated SIP server 103.

By allowing bursts of activity to be serviced by SIP servers 103, unless the bursts of activity are too long in duration of time (count of frequency counter exceeds the threshold for the maximum number of intervals to be in the overload condition), the utilization of SIP servers 103 is improved while at the same time SIP servers 103 are protected at least in part from being overloaded.

Upon admitting traffic to its associated SIP server 103 that exceeds the threshold for the overload condition, admission rate controller 104, in step 301, fires the interval timer for the next interval of time.

Method 300 may include other and/or additional steps that, for clarity, are not depicted. Further, method 300 may be executed in a different order presented and that the order presented in the discussion of FIG. 3 is illustrative. Additionally, certain steps in method 300 may be executed in a substantially simultaneous manner or may be omitted.

A description of admission rate controller 104 handling messages received during the process for managing bursts of traffic is provided below in connection with FIG. 4.

FIG. 4—Method for Handling Messages Received During Process for Managing Bursts of Traffic FIG. 4 is a flowchart of a method 400 for handling messages received during the process for managing bursts of traffic in accordance with an embodiment of the present invention.

Referring to FIG. 4, in conjunction with FIGS. 1-2, in step 401, admission rate controller 104 receives a message (e.g., an out-of-dialog message). In step 402, admission rate controller 104 determines whether the system is overloaded for this interval of time (e.g., 1 second). "Overloaded" may refer to the situation when the number of out-of-dialog messages received by admission rate controller 104 to be sent to its associated SIP server 103 exceeds a threshold for overload.

If the system is not overloaded, then, in step 403, admission rate controller 104 admits the received the message. That is, admission rate controller 104 sends the received message to its associated SIP server 103 to be processed.

If, however, the system is overloaded, then, in step 404, admission rate controller 104 determines if the traffic burst is allowed for this interval. If the traffic burst is not allowed for this interval (which occurs in step 308 of method 300), then, in step 405, admission rate controller 104 rejects the message.

If, however, the traffic burst is allowed for this interval (which occurs in step 309 of method 300), then, in step 406, admission rate controller 104 determines if the maximum number of out-of-dialog messages to be admitted has been reached. If the maximum number of out-of-dialog messages to be admitted has been reached, then, in step 405, admission rate controller 104 rejects the message. In this manner, SIP servers 103 are protected at least in part from being overloaded.

If, however, the maximum number of out-of-dialog messages to be admitted has not been reached, then, in step 403, admission rate controller 104 admits the received the message.

Upon admitting the received message in step 403 or upon rejecting the received message in 405, admission rate controller 104 receives the subsequent message in step 401.

Method 400 may include other and/or additional steps that, for clarity, are not depicted. Further, method 400 may be executed in a different order presented and that the order presented in the discussion of FIG. 4 is illustrative. Additionally, certain steps in method 400 may be executed in a substantially simultaneous manner or may be omitted.

Although the method, system and computer program product are described in connection with several embodiments, it is not intended to be limited to the specific forms set forth herein, but on the contrary, it is intended to cover such alternatives, modifications and equivalents, as can be reasonably included within the spirit and scope of the invention as defined by the appended claims. It is noted that the headings are used only for organizational purposes and not meant to limit the scope of the description or claims.

The invention claimed is:

1. A method for managing bursts of traffic, the method comprising the steps of:

incrementing a counter by an admission rate controller for each time interval in an overload condition;

decrementing said counter by said admission rate controller for each time interval not in said overload condition; and disabling a sending of a number of out-of-dialog messages that exceed a threshold indicating said overload condition to an associated session server in a next time interval if a count of said counter exceeds a second threshold, wherein said second threshold corresponds to a maximum number of time intervals to be in said overload condition.

2. The method as recited in claim 1 further comprising the step of:

permitting a sending of said number of out-of-dialog messages that exceed said threshold indicating said overload condition to said associated session server in said next time interval if said count of said counter does not exceed said second threshold.

3. The method as recited in claim 1 further comprising the step of:

incrementing said counter for each time interval in said overload condition unless said count of said counter exceeds a maximum number of counts.

4. The method as recited in claim 1 further comprising the step of:

decrementing said counter for each time interval not in said overload condition unless said count of said counter is equal to zero.

5. The method as recited in claim 1 further comprising the steps of:

receiving an out-of-dialog message during a time interval in said overload condition; and rejecting said received message if a maximum number of out-of-dialog messages to be admitted has been reached.

6. The method as recited in claim 1 further comprising the steps of:

receiving an out-of-dialog message during a time interval in said overload condition; and rejecting said received message if said sending of said number of out-of-dialog messages that exceed said threshold indicating said overload condition to said associated session server is disabled.

7. The method as recited in claim 1, wherein said associated session server corresponds to a server implementing Session Initiation Protocol.

8. The method as recited in claim 1, wherein said associated session server corresponds to a server implementing HyperText Transfer Protocol.

9. A system, comprising:

a memory unit for storing a computer program for managing bursts of traffic; and a processor coupled to said memory unit, wherein said processor, responsive to said computer program, comprises:

circuitry for incrementing a counter for each time interval in an overload condition;

circuitry for decrementing said counter for each time interval not in said overload condition; and circuitry for disabling a sending of a number of out-of-dialog messages that exceed a threshold indicating said overload condition to an associated session server in a next time interval if a count of said counter exceeds a second threshold, wherein said second threshold corresponds to a maximum number of time intervals to be in said overload condition.

10. The system as recited in claim 9, wherein said processor further comprises:
    circuitry for permitting a sending of said number of out-of-dialog messages that exceed said threshold indicating said overload condition to said associated session server in said next time interval if said count of said counter does not exceed said second threshold.

11. The system as recited in claim 9, wherein said processor further comprises:
    circuitry for incrementing said counter for each time interval in said overload condition unless said count of said counter exceeds a maximum number of counts.

12. The system as recited in claim 9, wherein said processor further comprises:
    circuitry for decrementing said counter for each time interval not in said overload condition unless said count of said counter is equal to zero.

13. The system as recited in claim 9, wherein said processor further comprises:
    circuitry for receiving an out-of-dialog message during a time interval in said overload condition; and
    circuitry for rejecting said received message if a maximum number of out-of-dialog messages to be admitted has been reached.

14. The system as recited in claim 9, wherein said processor further comprises:
    circuitry for receiving an out-of-dialog message during a time interval in said overload condition; and
    circuitry for rejecting said received message if said sending of said number of out-of-dialog messages that exceed said threshold indicating said overload condition to said associated session server is disabled.

15. A computer program product embodied in a non-transitory computer readable medium for managing bursts of traffic, the computer program product, when executed by a processor, performs the programming steps of:
    incrementing a counter for each time interval in an overload condition;
    decrementing said counter for each time interval not in said overload condition; and
    disabling a sending of a number of out-of-dialog messages that exceed a threshold indicating said overload condition to an associated session server in a next time interval if a count of said counter exceeds a second threshold, wherein said second threshold corresponds to a maximum number of time intervals to be in said overload condition.

16. The computer program product as recited in claim 15 further comprising the programming step of:
    permitting a sending of said number of out-of-dialog messages that exceed said threshold indicating said overload condition to said associated session server in said next time interval if said count of said counter does not exceed said second threshold.

17. The computer program product as recited in claim 15 further comprising the programming step of:
    incrementing said counter for each time interval in said overload condition unless said count of said counter exceeds a maximum number of counts.

18. The computer program product as recited in claim 15 further comprising the programming step of:
    decrementing said counter for each time interval not in said overload condition unless said count of said counter is equal to zero.

19. The computer program product as recited in claim 15 further comprising the programming steps of:
    receiving an out-of-dialog message during a time interval in said overload condition; and
    rejecting said received message if a maximum number of out-of-dialog messages to be admitted has been reached.

20. The computer program product as recited in claim 15 further comprising the programming steps of:
    receiving an out-of-dialog message during a time interval in said overload condition; and
    rejecting said received message if said sending of said number of out-of-dialog messages that exceed said threshold indicating said overload condition to said associated session server is disabled.

* * * * *